United States Patent [19]
Reid et al.

[11] 3,840,966
[45] Oct. 15, 1974

[54] APPARATUS FOR INSERTING PRESSFIT CUPS INTO CAN BODIES

[75] Inventors: Francis R. Reid; Rodney K. Gwiazdon, both of Minneapolis, Minn.

[73] Assignee: The Pillsbury Company, Minneapolis, Minn.

[22] Filed: June 13, 1973

[21] Appl. No.: 369,685

[52] U.S. Cl. .......................... 29/208 B, 29/DIG. 44
[51] Int. Cl. ............................................. B23p 19/04
[58] Field of Search .......... 29/208 B, 208 R, 211 R, 29/203 V, DIG. 44

[56] References Cited
UNITED STATES PATENTS
3,466,731  9/1969  Acton et al. ................. 29/208 B X

*Primary Examiner*—Thomas H. Eager
*Attorney, Agent, or Firm*—James V. Harman; Michael D. Ellwein; Ronald E. Lund

[57] ABSTRACT

Pressfit cups, such as plastic cups, are introduced into cylindrical can tubes prior to the application of the ends to the can tubes by sealing one end of the tube and drawing a vacuum therewithin so as to slide the cup into the tube. The apparatus comprises a framework supporting a turret for rotation. The turret is provided with pockets or recesses to hold the can tubes and cups. A rotary base plate is placed at one end of the turret to seal one open end of each tube located in one of the recesses. A drive is provided for rotating the turret and the tubes and a vacuum chamber is connected to the rotary base plate to draw a vacuum within each tube thereby causing the cups to slide through the tube to the desired position within the tube.

7 Claims, 3 Drawing Figures

APPARATUS FOR INSERTING PRESSFIT CUPS INTO CAN BODIES

THE PRIOR ART

Equipment has been available for introducing cups into can bodies mechanically, that is, by extending a ram or the like to force the cup into the can. These devices are expensive, require close tolerances and occupy a substantial amount of floor space.

THE OBJECTS

In view of the problems associated with the prior art, the general objective of this invention is to provide (a) an improved apparatus for inserting pressfit cups into can bodies which is relatively inexpensive, reliable and has a capacity of 800 or more cans per minute, (b) to enable the cups to be reliably inserted into the cylindrical can bodies by the application of vacuum wherein provision is made for preventing sliding friction between seals used for confining the vacuum to the desired location, (c) provision for properly aligning and maintaining alignment between the cups and the can bodies as the cups move into the can tube from a position outside the can tube and (d) a provision for accomodating can tubes of different lengths.

THE FIGURES

SUMMARY OF THE INVENTION

Figure 1:
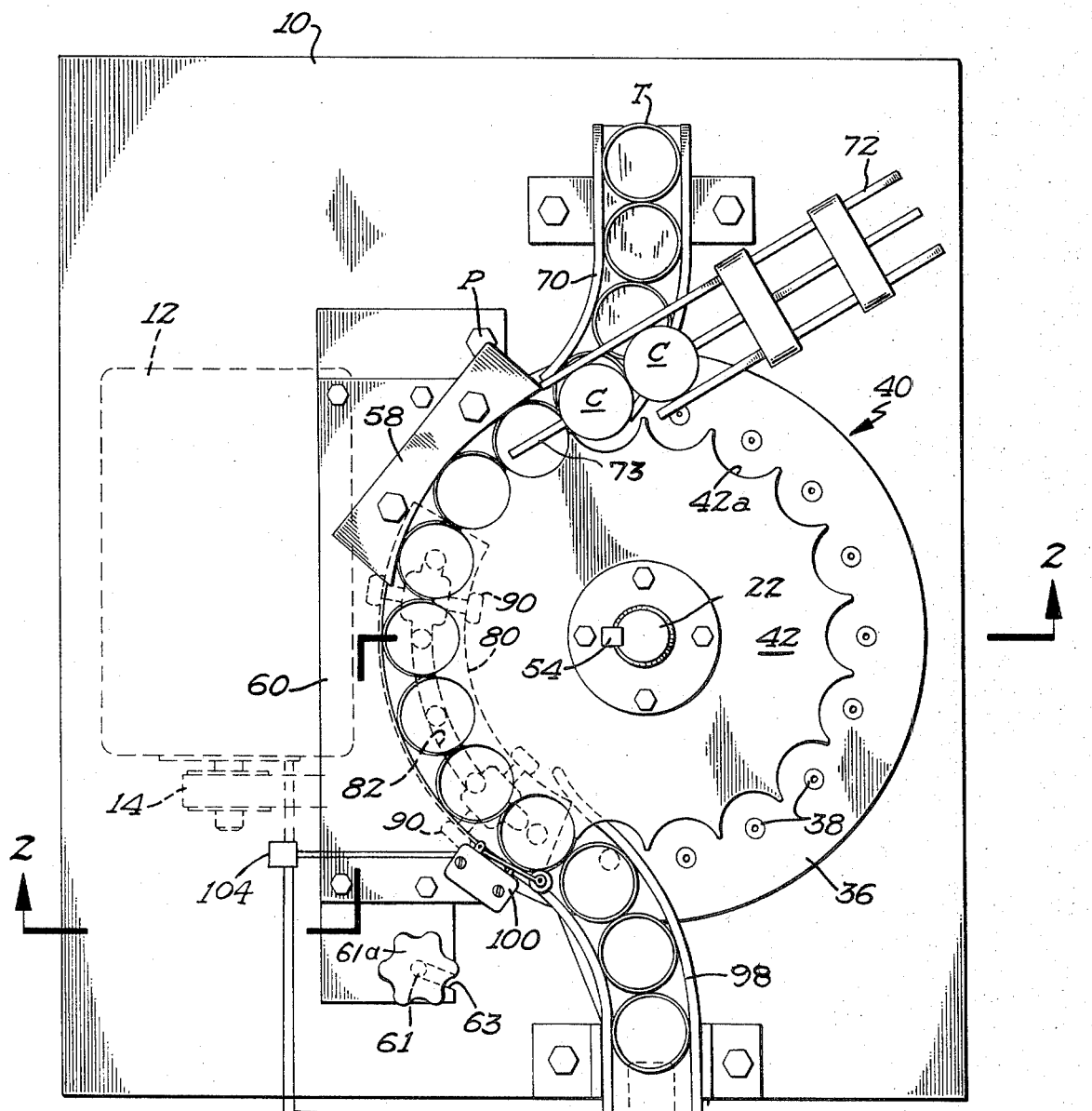
FIG. 1 is a plan view of the invention.

Pressfit cups, such as plastic cups, are introduced into cylindrical can tubes prior to the application of the ends to the can tubes by sealing one end of the tube and drawing a vacuum therewithin so as to slide the cup into the tube. The apparatus comprises a framework supporting a turret for rotation. The turret is provided with recesses to hold the can tubes and cups. A plate is placed at one end of the turret to seal one open end of each tube located in one of the recesses. A drive is provided for rotating the turret and the tubes and a vacuum chamber communicates through the plate to draw a vacuum within each tube thereby causing the cups to slide through the tube to the desired position within the tube.

DESCRIPTION OF THE PREFERRED EMBODIMENT

Refer now to the Figures. Briefly, the apparatus comprises a framework 10 supporting a turret 40 for rotation on a vertical axis. The turret 40 is provided with recesses 44a and 46a for holding the can tubes T. Rotary base plate 36 used to support the tubes and supply vacuum thereto is placed at the lower end of the turret to contact the open lower end of each tube placed in one of the recesses. A drive is provided for rotating the turret 40 and the tubes T and a vacuum duct 84 is connected to the plate to draw a vacuum within each tube to suck each cup C placed on the opposite end of the tube from the plate into the tube causing it to slide through the tube to a desired point near the bottom in this case until the cup strikes plate 36. The cups fit frictionally within the tubes T and can be thought of as pressfit cups. The apparatus will, however, handle loosefitting cups provided the opening around the periphery is not too large. The cups, usually formed from plastic, are drawn into cylindrical can tubes T prior to the application of the ends to the can tubes. Cups of this kind are used, for example, in holding frosting used for covering canned rolls and turnovers. The cup travels downwardly until it strikes plate 36 thereby aligning it exactly with the bottom of the tube T. During the bottom capping operation of the tube the cap (not shown) may push the cup back slightly into the container.

Figure 2:
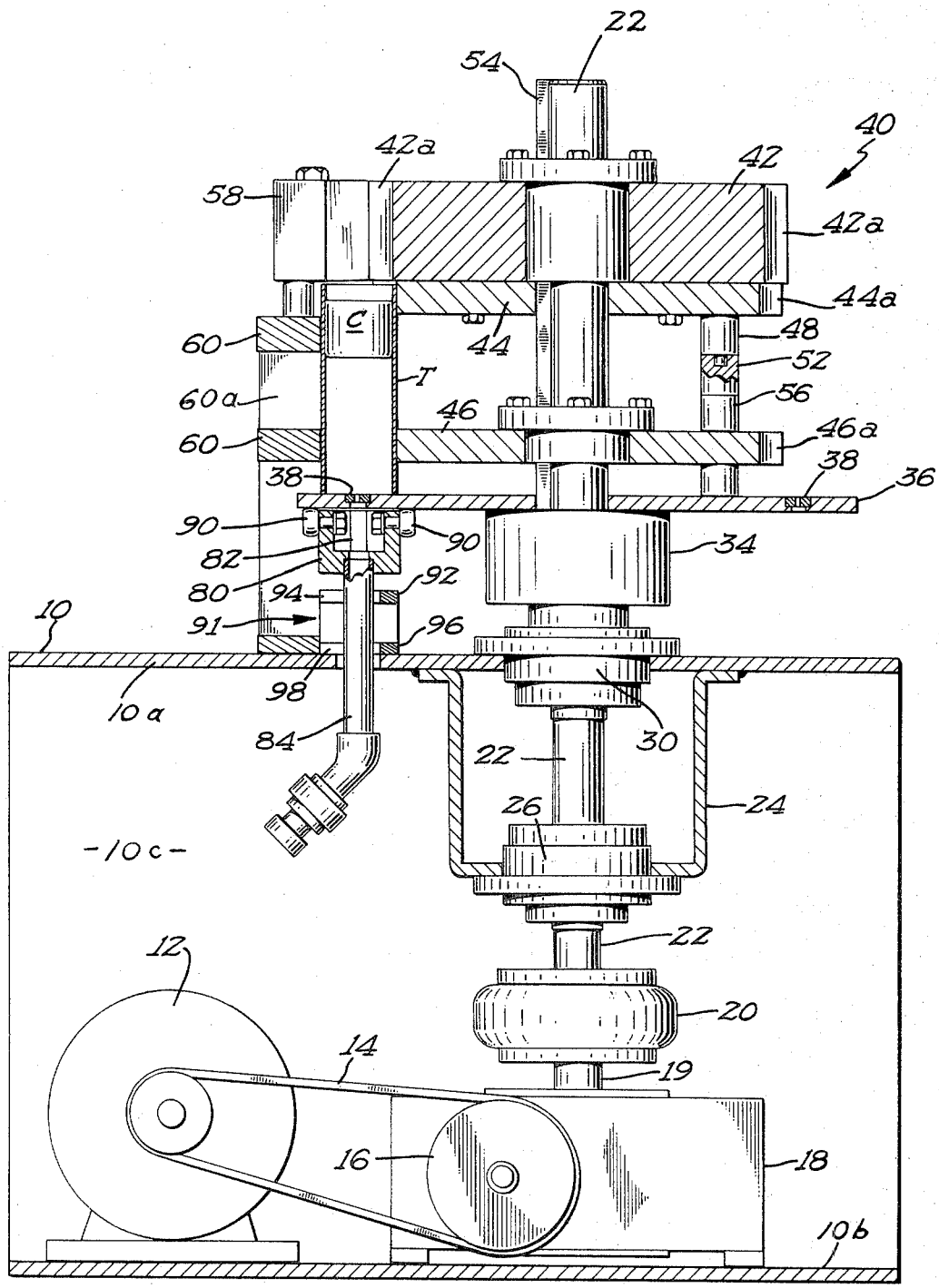
FIG. 2 is a vertical sectional view taken on line 2—2 of FIG. 1.

As seen in FIG. 2, the supporting framework 10 comprises upper and lower horizontally disposed plates 10a and 10b connected by vertical plates 10c (only one of which is shown). A variable speed d.c. electric drive motor 12 turns the turret 40 via drive belt 14, sheave 16, gear box 18, shaft 19, coupling 20 and shaft 22 which extends through the bearings 26 and 30 on bracket 24 and plate 10a respectively. The rotary base plate 36 is secured to shaft 22 and collar 34 by key 54 and is provided with readily removable circumferentially spaced flow control orifaces 38 having a diameter of a fraction of an inch, usually less than 1/2 of an inch, e.g. 5/16 inches, which are fitted into suitable recesses within plate 36 for the purpose of controlling air flow from the tubes T. The orifices inserts 38 are provided primarily for preventing a loss of vacuum in the system in the event a cup becomes cocked in tube T, which if the opening 38 were larger in diameter, would tend to cause a vacuum loss in all of the tubes over the head 80.

The parts of the turret 40 above plate 36 will now be described. Three pocketed wheels 42, 44 and 46 are keyed to shaft 22 and suitably affixed thereto as by means of bolts or the like. These wheels include vertically disposed longitudinally extending and circumferentially spaced semicylindrical pockets 42a, 44a and 46a respectively, those designated 42a being somewhat further from the axis of shaft 22 and of a smaller radius than 44a or 46a so as to align the cups C placed therein with the axis of the tubes T in the pockets 44a–46a. Between the wheels are provided split spacers consisting of parts 48, 52 and 56, the top portion 48 of which can be removed when shorter size cans are to be used by lifting plates 42, 44 withdrawing the spacers 48 and lowering the guide 58 as required.

The guide 58 is mounted rigidly by bolts upon the framework 10 and consists of a metal block having a cylindrically curved concave surface on the side facing the turret 40 so as to engage and guide the cups C as they travel in counterclockwise direction with rotating turret as best seen in FIG. 1.

Below the guide 58 is a second guide 60 of a much larger size, consisting of vertically spaced apart plates suitably connected together rigidly as by means of a centerpiece 60a to form a single rigid structure mounted for pivotal movement on pivot P and held releasably in place by means of a locking screw 61 adapted to fit into a recess 63 at the other end of the guide 60. The locking screw is threaded into the plate 10a and has a handwheel 61a on its upper end enabling the guide 60 to be quickly released and pivoted away from the turret 40 in the event of a jam-up.

The tubes T are choke fed to the apparatus through a chute 70 positioned at the proper elevation to feed tubes which are positioned in mutually parallel alignment and in alignment with the shaft 22. The tubes are arranged with their lower edges in alignment with the top surface of the plate 36 so that as the tubes T pass from the chute 70 onto the plate 36 they are engaged by the recesses 44a and 46a and are carried in a counterclockwise direction around the turret with their lower ends sealed by plate 36.

Similarly, the cups C are choke fed through a chute 72 including rigidly mounted stringers at the proper elevation to enable the cups C to become engaged in the recesses 42a. Thus both the tubes and the cups are self spacing on the turret. The stringer 73 that supports the cups on the bottom (FIG. 1) terminates somewhat downstream from the inlet end of the guide 58 so that when each cup travels beyond the end of the stringer 73 it is engaged on one side by the guide 58 and on the opposite side by one of the recesses 42a. It will then fall due to gravity and come to rest for a moment on the upper end of the tube immediately below it. At this point the vacuum adjusted to about 15–20 inches of mercury to keep the cups from being smashed down too hard is applied to the tube thereby sucking the cup down to the bottom of the tube. The vacuum within the tube usually straightens any cup which is cocked in the top of the tube.

Figure 3:
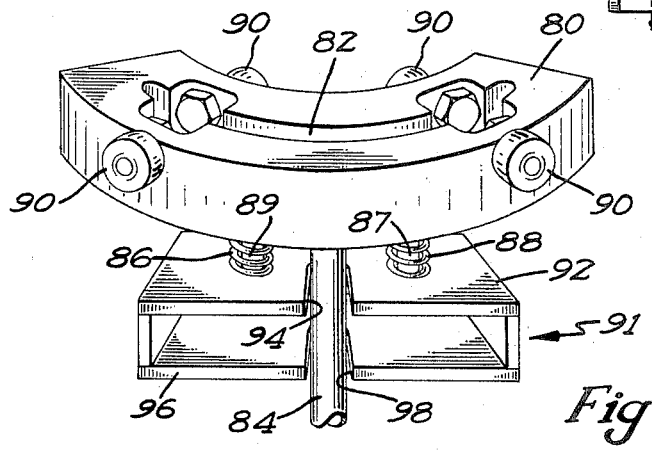
FIG. 3 is a perspective view of the vacuum head on a somewhat enlarged scale relative to FIGS. 1 and 2.

The vacuum assembly 80, best seen in FIGS. 2 and 3, consists of a hollow box immediately beneath the plate 36. A curved vacuum recess 82 therein coincides with the path taken by the orifices 36. Mounted rigidly on frame 10 is a pedestal 91. The head 80 is held in the desired horizontal position on pedestal 91 by support posts 87 and 89 extending downwardly from the head 80 which are free to slide up and down in holes bored within the upper section 92 of the pedestal. The pedestal is provided with suitable recesses 94 and 98 to accomodate the vacuum duct 84. Vacuum is supplied to the head 80 through line 84. The head 80 is biased upwardly from a supporting pedestal 92 by a pair of springs 86 and 88 (FIG. 3).

Mounted upon the vacuum head 80 are cambered spacer wheels 90 the upper edges of which project a fraction of an inch, e.g. about .001 inches above the upper surface of the head 80 thereby spacing the head slightly from the bottom of plate 36 and eliminating sliding friction between these parts.

The tubes with the cups in place are removed by means of chute 98 (FIG. 1). The presence of cups which have not been drawn into the tubes is detected by a sensor such as microswitch 100 positioned above the top of the tubes T and cups which have not been drawn all the way into the bottom are found by a sensor such as microswitch 102 having its moving switch element adapted to engage the lower part of the tube. If no cup is present at the bottom of the tube, the switch feeler will rise into the tube actuating the switch. The switches are suitably wired to a controller 104 for stopping the motor 12 or if desired for mechanically or pneumatically eject defectively assembled cans from main path taken by the cans after leaving the turret when either a cup has not been drawn into the tube at all or has not reached the bottom. The apparatus will fill more than 10 tubes a second. It will also be noticed that since the action of the vacuum is relatively gentle, the movement of the cups cannot damage the inside surfaces of the tubes which is important in preventing the leakage of liquid contained in the package through metal foil often used to line the cans. The apparatus occupies a relatively small floor space typically about 4 feet by 4 feet.

What is claimed is:

1. An apparatus for inserting pressfit cups into can bodies comprising in combination a supporting framework, a turret mounted upon the supporting framework for rotation thereon and having recesses positioned parallel to one another thereon and distributed circumferentially on a periphery of the turret to hold can tubes in parallel alignment, a base plate at one end of the turret to engage the ends of the tubes when placed in the recesses on the turret and to thereby effectively seal the adjacent tube ends, vacuum duct means communicating through the base plate to the interior of the tubes to draw a vacuum therewithin, means provided for feeding the cups to the ends of the tubes opposite the base plate and for allowing the cups to fit loosely in the ends of the tubes whereby each of said cups placed in the open end of one of the tubes opposite the plate will be drawn through the tube by the vacuum as the turret rotates whereby the cups will slide through the tubes to a position within the tube.

2. The apparatus of claim 1 wherein the turret comprises a first wheel means having circumferentially spaced recesses therein for the tubes and a second wheel means spaced axially thereof with circumferentially spaced recesses therein for the cups, the cup recesses in the second wheel being spaced further from the axis of the turret to align the cups engaged coaxially with the tubes in the recesses provided within the first wheel means.

3. The apparatus of claim 1 wherein a vacuum chamber is positioned on the opposite side of the base plate from the tubes, communicating orifices are provided through the plate and the vacuum chamber communicates through the orifices with the interior of the tubes to apply the vacuum thereto.

4. The apparatus of claim 3 wherein the vacuum head is provided with spacer wheels adapted to engage the plate to prevent sliding friction from between the plate and the vacuum chamber.

5. The apparatus of claim 4 wherein the vacuum chamber is yieldably biased against the surface of the plate.

6. The apparatus of claim 1 wherein a vacuum chamber is positioned on the opposite side of the base plate from the tubes, orifaces are provided in the plate and a vacuum chamber communicates through the orifices with the interior of the tubes to apply vacuum therewithin, the vacuum chamber is provided with spacer wheels adapted to engage the plate to prevent sliding friction from between the plate and the vacuum chamber and the vacuum chamber is yieldably biased against the surface of the plate.

7. An apparatus for inserting pressfit cups into can bodies comprising in combination a supporting framework, a turret comprising first and second spaced apart turret wheels for engagement with the tube, means for changing the axial spacing between the first and second wheels and a third wheel spaced axially on the turret from the first two said wheels, coaxial recesses in the first two said wheels and circumferentially spaced aligned recesses in the third wheel positioned at a greater distance from the axis than those in the first two wheels for aligning each cup with the axis of each tube placed in the recesses within the first two wheels, a base plate at one end of the turret to engage the ends of the tubes when placed in the recesses on the turret to thereby effectively seal the adjacent ends, vacuum duct means communicating through the base plate to the interior of the tubes to draw a vacuum therewithin, means provided for feeding cups to the ends of the tubes opposite the base plate and for allowing the cups to fit loosely in the ends of the tubes whereby each cup placed in the open end of a tube opposite the plate will be drawn through the tube by the vacuum as the turret rotates whereby the cups will slide through the tubes to a selected position.

* * * * *